United States Patent [19]

Hall, III

[11] Patent Number: 5,605,211
[45] Date of Patent: Feb. 25, 1997

[54] PARK MECHANISM FOR A POWER TRANSMISSION

[75] Inventor: Arthur Hall, III, Cicero, Ind.

[73] Assignee: General Motors Corporation, Detroit, Mich.

[21] Appl. No.: 546,421

[22] Filed: Oct. 20, 1995

[51] Int. Cl.⁶ .................................................. B60K 41/26
[52] U.S. Cl. ........................ 192/4 A; 74/411.5; 188/31; 192/69.1
[58] Field of Search .................. 188/31, 82.3; 74/411.5; 192/4 A, 69.1

[56] References Cited

U.S. PATENT DOCUMENTS

| Re. 17,458 | 10/1929 | Mikesh | 192/4 A |
|---|---|---|---|
| 1,309,197 | 7/1919 | Heins | 188/31 |
| 1,450,409 | 4/1923 | Cirac | 188/31 X |
| 2,072,764 | 3/1937 | McCoy | 188/31 |
| 3,300,001 | 1/1967 | Stockton | 192/4 A |
| 3,856,119 | 12/1974 | Harrington | 188/82.3 |
| 5,531,303 | 7/1996 | Raszkowski | 188/31 X |

*Primary Examiner*—Rodney H. Bonck
*Attorney, Agent, or Firm*—Donald F. Scherer

[57] ABSTRACT

The output shaft of a power transmission is selectively connectible with a stationary housing by a plurality of parking pawls. The pawls are pivotally mounted in a wall member and spring-loaded to an extended position whereby recesses in an output driven disc are engaged. An operator controlled actuator member is selectively movable into abutment with the pawls to enforce retraction thereof into pawl recesses such that the recesses in the disk are not engaged.

1 Claim, 1 Drawing Sheet

PARK MECHANISM FOR A POWER TRANSMISSION

TECHNICAL FIELD

This invention relates to parking mechanisms, and more particularly, to such mechanisms having pawl members selectively engageable with a transmission driven member.

BACKGROUND OF THE INVENTION

Automatic shifting power transmissions generally include operator actuated park systems which selectively engage a member secured to a transmission output shaft for preventing rotation thereof. These park systems are useful in preventing rotation of the vehicle drive wheels or final drive mechanism when the operator desires to park the vehicle unattended for an extended period of time.

SUMMARY OF THE INVENTION

It is an object of this invention to provide an improved park mechanism for a power transmission.

In one aspect of the invention, a plurality of pawls are pivotally mounted in a stationary member for selective engagement with a plurality of pockets or recesses on an output driven member of a transmission.

In another aspect of this invention, the pawls are controlled in their pivotal movement partially by an axially movable park actuator.

In yet another aspect of this invention, the pawls are continuously resiliently urged toward engagement with the driven member.

DESCRIPTION OF AN EXEMPLARY EMBODIMENT

Figure 1:
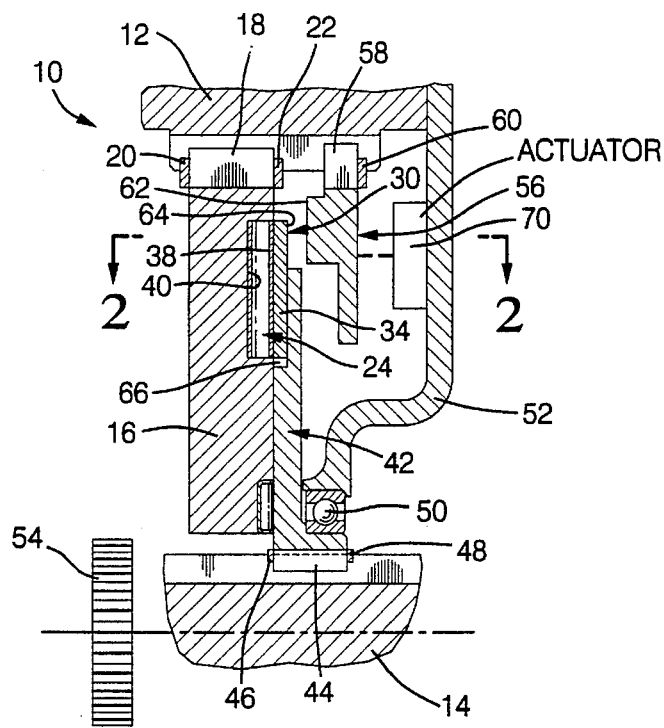
FIG. 1 is a sectional elevational view of a portion of a transmission including a park mechanism, incorporating the present invention, showing the mechanism in the "Park" position.

A park mechanism, generally designated 10, is disposed within a transmission housing 12 for selective engagement between the housing 12 and a transmission output member or shaft 14.

The park mechanism 10 includes a stationary disc or wall 16 which is splined at 18 to the housing 12 and positioned therein by a pair of conventional locking rings 20 and 22. The wall 16 has formed therein a plurality of park recesses 24, each of which has a rectangular cross section portion 26 and a circular cross section portion 28.

A park pawl 30 is disposed in each of the pawl recesses. Each pawl 30 has a cylindrical portion 32 pivotally disposed in the portion 28, and an arm portion 34 which extends from the cylindrical portion 32. Each arm portion 34 has an engagement surface 36. A spring 38 is disposed in each recess 24 between a wall portion 40 of the recess 24 and the arm 34 of the park pawl 30. The spring 38 is effective to urge the park pawl 30 to pivot within the portion 28 such that the arm 34 is urge outward in an axial direction from the recess 24.

Figure 2:
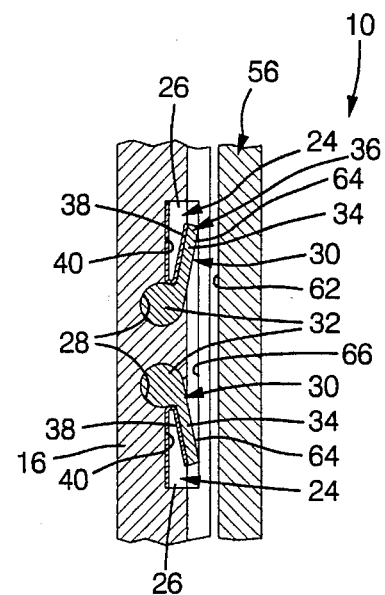
FIG. 2 is a view taken along line 2—2 of FIG. 1.

In FIG. 2, two such park pawls 30 are shown, however, a plurality of these pawls are disposed about the surface of the wall 16. The park mechanism 10 further includes a driven disc member 42 which is splined at 44 to the output member 14 and located thereon by a pair of conventional lock rings 46 and 48.

The driven disc 42, and therefore the output member 14, can be rotatably supported in a bearing 50 which in turn is supported on a support hub 52 which is secured to the housing 12. The output member 14 is drivingly connected to a driven gear 54 which in turn may drive a final drive assembly such as a differential gear set or a track laying mechanism.

Figure 3:
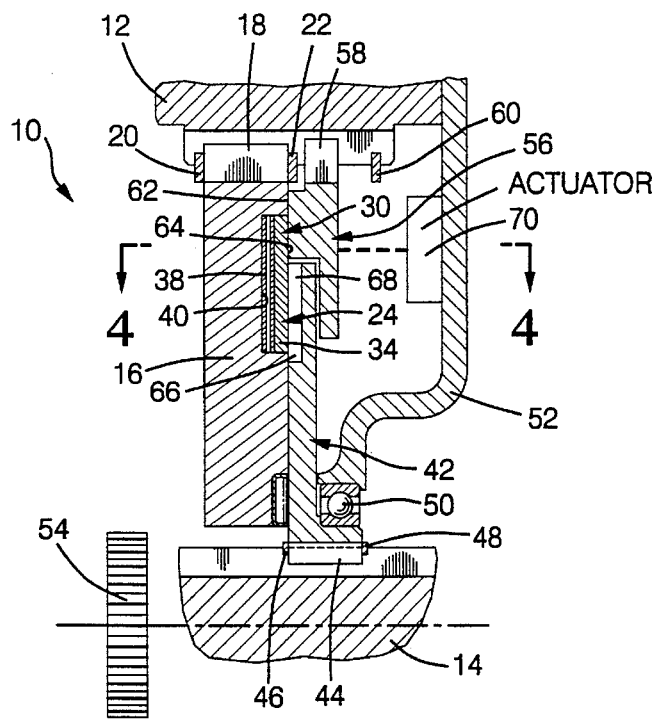
FIG. 3 is a view similar to FIG. 1 showing the park mechanism in a non-Park position.

The park mechanism 10 also has an actuator disc 56 which is splined at 58 so as to be slidably disposed relative to the housing 12. The rightward movement, as seen in FIGS. 1 and 3, is limited by a conventional locking ring 60. The disc 56 includes an actuating surface 62 which is aligned with an outer portion 64 of each pawl 30 such that upon axial movement relative to the output member 14, the surface 62 will be forced into abutment with the portion 64 such that the pawls 30 will be pivoted within the portion 28 against the force in springs 38 to the position shown in FIGS. 3 and 4.

The driven disc 42 includes a plurality of latch recesses or pockets 66 which are spaced about the surface of the driven disc 42. These pockets are sized to accommodate the entrance of two adjacent oppositely facing pawls 30. As seen in FIG. 2, the adjacent pawls 30 are disposed to extend their arm portions 34 in substantially opposite circumferential direction. This will permit the one pawl to operate in the forward direction of rotation and the adjacent pawl to operate in the reverse direction of rotation.

Each pocket 66 has an engaging surface 68 which the respective pawl 30 can engage when permitted to extend under the force of spring 38. The engagement between the arm 34 and the surface 68 will essentially connect the disc 42 to the wall 16. This will effectively prevent rotation of the output member 14 relative to the housing 12, thus placing the transmission in a "Park" position.

The actuator 56 is controlled in its linear or axial position by a conventional actuator mechanism 70 which is controlled by the vehicle operator to effect the desired position of the actuator 56. The actuator 70 may be any of the conventional mechanical, hydraulic or electro-mechanical or electro-hydraulic devices currently available on the market. A simple lever energized by the operator, for example, will provide an actuator.

As seen in FIGS. 1 and 2, the actuator 70 has been manipulated to permit the actuator 56 to disengage from the pawls 30 thereby permitting the pawls 30 to pivot in the portion 28, such that they are extended axially into the path of the pocket 66. In this position, the surface 36 of the pawl 30 will engage the surface 68 of the pocket 66 if the output shaft or output member 14 attempts to rotate relative to the pawls and therefore wall 16. This will prevent the output member 14 from rotating and therefore prevent the vehicle from being moved.

Figure 4:
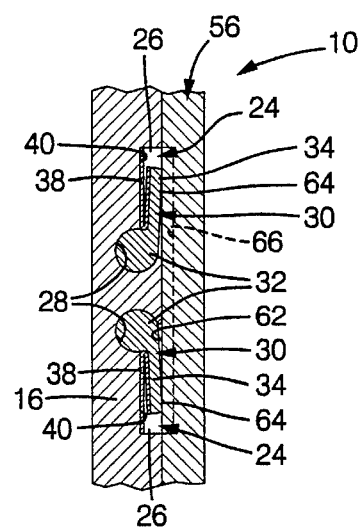
FIG. 4 is a view taken along line 4—4 of FIG. 3.

When it is desirable to again cause the vehicle to move, the actuator 70 is manipulated by the operator to the position shown in FIGS. 3 and 4, such that the actuator 56 engages the arms 34 of pawls 30 to force the pawls 30 into the recesses 24 formed in the wall 16. In this position, the pawls 30 do not interfere with the rotational ability of the disc 42 and therefore the output member 14 is free to rotate.

As mentioned above, there are only two pawls 30 and one pocket 66 shown. However, it is contemplated that a plurality of both such units will be employed. Preferably, the pocket 66 will be evenly disposed about the surface of the disc 42 and the pawls 30 will be equally disposed about the wall 16. However, it is also contemplated that the number of pawl pairs and the number of pockets 66 will not be the same. For example, the system might use nine pairs of pawls and eight pockets, or ten pockets and nine pairs of pawls. This arrangement will decrease the amount of rotation necessary before the pawls 30 are aligned with respective pockets when parking is desired.

Another arrangement which is considered is that the pockets 66 are equally disposed about the driven disc 42 while the pairs of pawls 30 are disposed in random order about the wall 16, again to decrease the relative rotation between the wall 16 and disc 42 during engagement of the park mechanism.

Also, as seen in the drawings, the surfaces 68 are essentially chordal in nature as is the surface 36 of the pawl 30. However, it is considered that the surfaces might be made radial in nature thereby accommodating an increased number of pockets and pawls in any given system.

Obviously, many modifications and variations of the present invention are possible in light of the above teaching. It is therefore to be understood, that within the scope of the appended claims, the invention may be practiced otherwise than as specifically described.

I claim:

1. A park mechanism in a power transmission comprising:

a transmission output member;

a stationary housing portion supporting the output member;

a wall secured in the housing portion having a plurality of pawl support recesses formed therein;

a plurality of pawl members pivotally supported in pairs in the pawl support recesses, each pair being disposed to present engagement surfaces in opposite facing directions;

a driven disc member drivingly connected with the transmission output member and having a plurality of pockets formed therein, each pocket being of sufficient size to accept insertion of a pair of said pawl members and having oppositely disposed engaging surfaces defining two edges of the respective pocket and being selectively engageable by respective pawl members when a "Park" position is attained; and an actuator disposed for sliding movement in the housing to selectively pivot the pawls between the "Park" position and a non-"Park" position.

* * * * *